United States Patent
Tanaka (10) Patent No.: US 10,334,360 B2
(45) Date of Patent: Jun. 25, 2019

(54) METHOD FOR ACCURATELY CALCULATING THE DIRECTION OF ARRIVAL OF SOUND AT A MICROPHONE ARRAY

(71) Applicant: Ryo Tanaka, Concord, MA (US)

(72) Inventor: Ryo Tanaka, Concord, MA (US)

(73) Assignee: RevoLabs, Inc, Sudbury, MA (US)

( * ) Notice: Subject to any disclaimer, the term of this patent is extended or adjusted under 35 U.S.C. 154(b) by 0 days.

(21) Appl. No.: 15/905,137

(22) Filed: Feb. 26, 2018

(65) Prior Publication Data

US 2018/0359563 A1 Dec. 13, 2018

Related U.S. Application Data

(60) Provisional application No. 62/518,294, filed on Jun. 12, 2017.

(51) Int. Cl.
*H04R 3/00* (2006.01)
*H04R 1/40* (2006.01)
*H04R 3/04* (2006.01)

(52) U.S. Cl.
CPC ............ *H04R 3/005* (2013.01); *H04R 1/406* (2013.01); *H04R 3/04* (2013.01)

(58) Field of Classification Search
CPC .......... G01S 5/20; G06F 3/167; G08B 21/24; G10L 15/32; G10L 21/028; H04R 1/406; H04R 3/005; H04S 7/301; G01C 21/206
USPC ....... 348/14.01; 381/56, 71.11, 73.1, 92, 57, 381/59, 94.1, 96; 463/1, 36; 367/125, 367/127
See application file for complete search history.

(56) References Cited

U.S. PATENT DOCUMENTS

| | | | | |
|---|---|---|---|---|
| 6,198,693 B1* | 3/2001 | Marash | ............... | G01S 3/8083 342/417 |
| 6,690,618 B2* | 2/2004 | Tomasi | ............... | G01S 5/18 367/124 |
| 7,843,486 B1* | 11/2010 | Blair | ............... | H04M 3/568 348/14.01 |
| 8,565,446 B1* | 10/2013 | Ebenezer | ............... | H04R 3/005 381/122 |
| 9,430,931 B1* | 8/2016 | Liu | ............... | G08B 21/24 |
| 9,753,119 B1* | 9/2017 | Velusamy | ............... | G01S 5/20 |
| 10,104,489 B2* | 10/2018 | Arnold | ............... | H04R 1/406 |
| 2006/0088174 A1* | 4/2006 | DeLeeuw | ............... | H04S 7/301 381/96 |
| 2007/0111767 A1* | 5/2007 | Brown | ............... | A63B 24/0003 463/1 |
| 2009/0052687 A1* | 2/2009 | Schwartz | ............... | H04R 3/005 381/92 |
| 2009/0097670 A1* | 4/2009 | Jeong | ............... | H04R 3/005 381/73.1 |
| 2009/0279714 A1* | 11/2009 | Kim | ............... | H04R 3/005 381/92 |

(Continued)

*Primary Examiner* — Gerald Gauthier
(74) *Attorney, Agent, or Firm* — Robert Schuler (57) ABSTRACT

A signal processing unit calculates a first difference in time of arrival of sound from a sound source to a first and to a second microphone comprising a microphone array and calculates a second difference in time of arrival, which is the difference between the first difference in time of arrival and an actual time, of arrival, and determines the position of the sound source based on the sum of the first difference in time of arrival and the second difference in time of arrival.

7 Claims, 11 Drawing Sheets

(56) References Cited

U.S. PATENT DOCUMENTS

| | | | | |
|---|---|---|---|---|
| 2009/0279715 | A1* | 11/2009 | Jeong | H04R 3/005 381/92 |
| 2011/0275434 | A1* | 11/2011 | Cheng | A63F 13/06 463/36 |
| 2012/0070015 | A1* | 3/2012 | Oh | G10L 21/0208 381/92 |
| 2012/0076316 | A1* | 3/2012 | Zhu | H04R 3/005 381/71.11 |
| 2013/0058492 | A1* | 3/2013 | Silzle | H04R 5/027 381/59 |
| 2013/0259243 | A1* | 10/2013 | Herre | G10L 19/02 381/57 |
| 2014/0369509 | A1* | 12/2014 | Fukamachi | G01S 13/93 381/56 |
| 2014/0376741 | A1* | 12/2014 | Kechichian | G01S 3/8083 381/92 |
| 2016/0217789 | A1* | 7/2016 | Lee | G10L 15/32 |
| 2017/0070814 | A1* | 3/2017 | Lu | H04R 3/005 |
| 2017/0083285 | A1* | 3/2017 | Meyers | G10L 15/063 |
| 2017/0140771 | A1* | 5/2017 | Taniguchi | G10L 15/05 |
| 2017/0164101 | A1* | 6/2017 | Rollow, IV | H04R 1/406 |
| 2017/0219354 | A1* | 8/2017 | Vasgaard | G01C 21/206 |
| 2018/0139560 | A1* | 5/2018 | Shi | G06F 3/165 |
| 2018/0160223 | A1* | 6/2018 | Jones | G06Q 50/28 |
| 2018/0359563 | A1* | 12/2018 | Tanaka | H04R 1/406 |

* cited by examiner

METHOD FOR ACCURATELY CALCULATING THE DIRECTION OF ARRIVAL OF SOUND AT A MICROPHONE ARRAY

1. FIELD

One embodiment of the present invention relates to a sound collecting device for acquiring the sound of a sound source using a microphone and to a sound collecting method.

2. DESCRIPTION OF THE RELATED ART

Sound collecting devices may estimate the direction of arrival of a sound source to improve the sensitivity of an array microphone in the direction of the sound source. To find the direction of arrival of the sound source, the sound collecting device finds the correlation between the collected sound signals of a plurality of microphones. The sound collecting device estimates the direction of arrival by calculating the difference in time of arrival of sound from the sound source to the plurality of microphones. The difference in time of arrival is found using, for example, a cross-correlation function. The sound collecting device finds the cross-correlation function of the collected sound signals of the plurality of microphones, and finds a sample number when the cross-correlation function indicates a peak. This sample number corresponds to the difference in time of arrival of sound from the sound source to the plurality of microphones. The difference in time of arrival is converted to a distance by multiplying by the speed of sound. Therefore, the sound collecting device can estimate the direction of arrival using a trigonometric function operation based on the distance between the plurality of microphones and a distance found by multiplying the speed of sound by the difference in time of arrival.

However, when finding the difference in time of arrival using a cross-correlation function in time domain, a difference in time of one sample or less cannot be found. Therefore, the estimation accuracy of the direction of arrival depends on the sampling frequency and the distance between the plurality of microphones.

3. SUMMARY

The sound collecting device is provided with a plurality of microphones (i.e., microphone array) and a signal processing unit. The signal processing unit calculates a total or actual time difference of arrival of sound between microphone in an array by adding a calculated first difference in time of arrival to a calculated second time of arrival. The first difference in time of arrival is based on the difference in time of arrival of sound from a sound source to the plurality of microphones with an accuracy to one intersample time, calculates a second difference in time of arrival, which is the difference between the first difference in time of arrival and the difference in the actual time of arrival, and estimates the position of the sound source based on the third or actual time of arrival.

4. BRIEF DESCRIPTION OF THE DRAWINGS

The present invention can be best understood by reading the specification with reference to the following figures, in which.

5. DETAILED DESCRIPTION

Figure 1:
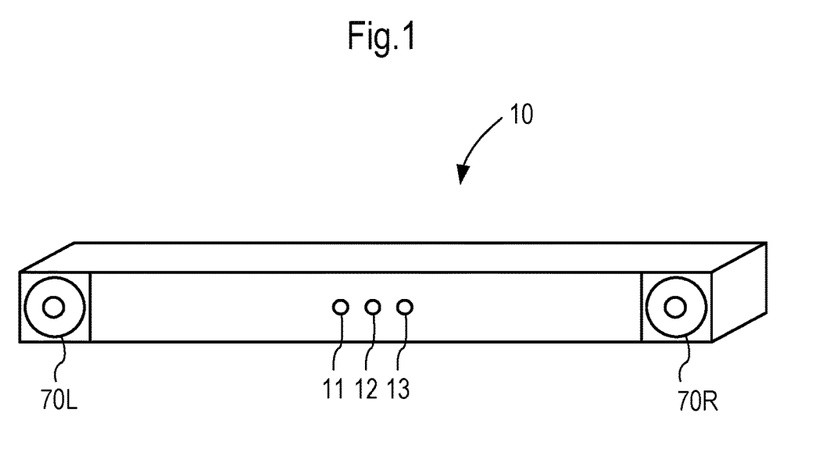
FIG. 1 is an external perspective view illustrating a configuration of a sound emitting/collecting device 10.

FIG. 1 is a perspective view schematically illustrating the sound emitting/collecting device 10. FIG. 1 illustrates the main configuration of emitted sound and collected sound, and does not illustrate other configurations.

The sound emitting/collecting device 10 is provided with a rectangular parallelepiped housing 1, a microphone array having microphone 11, a microphone 12, and a microphone 13, a speaker 70L, and a speaker 70R. The plurality of microphones arranged as an array; microphone 11, microphone 12, and microphone 13 are disposed in a line on one side surface of the housing 1. The speaker 70L and the speaker 70R are disposed as a pair on the outsides of the microphone 11, the microphone 12 and the microphone 13, interposing the microphone 11, the microphone 12, and the microphone 13 therebetween. 2

In this example, there are three microphones, but the sound emitting/collecting device 10 can operate as long as at least two or more microphones are installed. Furthermore, the number of speakers is not limited to two, and the sound emitting/collecting device 10 can operate as long as at least one or more speakers are installed. Furthermore, the speaker 70L and the speaker 70R may be provided as a separate configuration from the housing 1.

Figure 2:
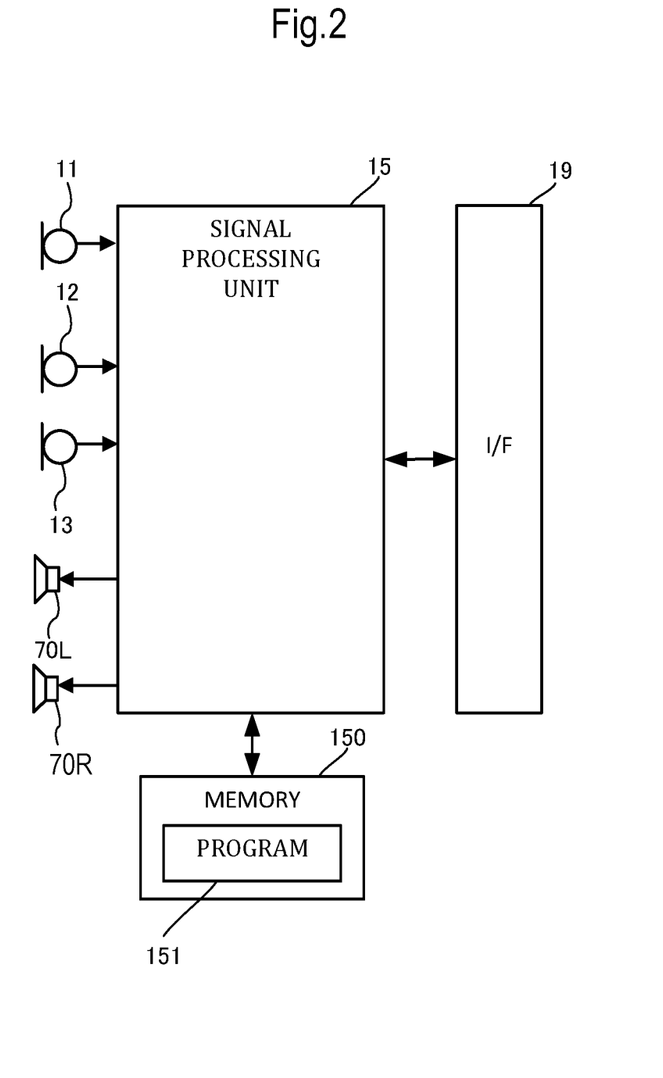
FIG. 2 is a block diagram illustrating a configuration of the sound emitting/collecting device 10.

FIG. 2 is a block diagram of the sound emitting/collecting device 10 shown with reference to FIG. 1. As illustrated in FIG. 2, the sound emitting/collecting device 10 is provided with the microphone 11, the microphone 12, the microphone 13, the speaker 70L, the speaker 70R, the signal processing unit 15, a memory 150, and an interface (I/F) 19. A collected sound signal, which is a voice acquired by the microphone 11, the microphone 12, and the microphone 13, is signal processed in the signal processing unit 15, and is input to the I/F 19. The I/F 19 is, for example, a communications I/F, and transmits the collected sound signal to an external device (remote location). Alternatively, the I/F 19 receives an emitted sound signal from an external device. The memory 150 saves the collected sound signal acquired by the microphone 11, the microphone 12, and the microphone 13 as recorded sound data. The signal processing unit 15 operates on the sound acquired by the microphone 11, the microphone 12, and the microphone 13 as described in detail below. Furthermore, the signal processing unit 15 processes the emitted sound signal input from the I/F 19. The speaker 70L and the speaker 70R emit the signal that has undergone signal processing in the signal processing unit 15.

Note that the functions of the signal processing unit 15 can also be realized in a general information processing device, such as a personal computer. In this case, the information processing device realizes the functions of the signal processing unit 15 by reading and executing a computer program (i.e., software or firmware) 151 stored in the memory 150, or a program stored on a recording medium such as a flash memory.

Figure 3:
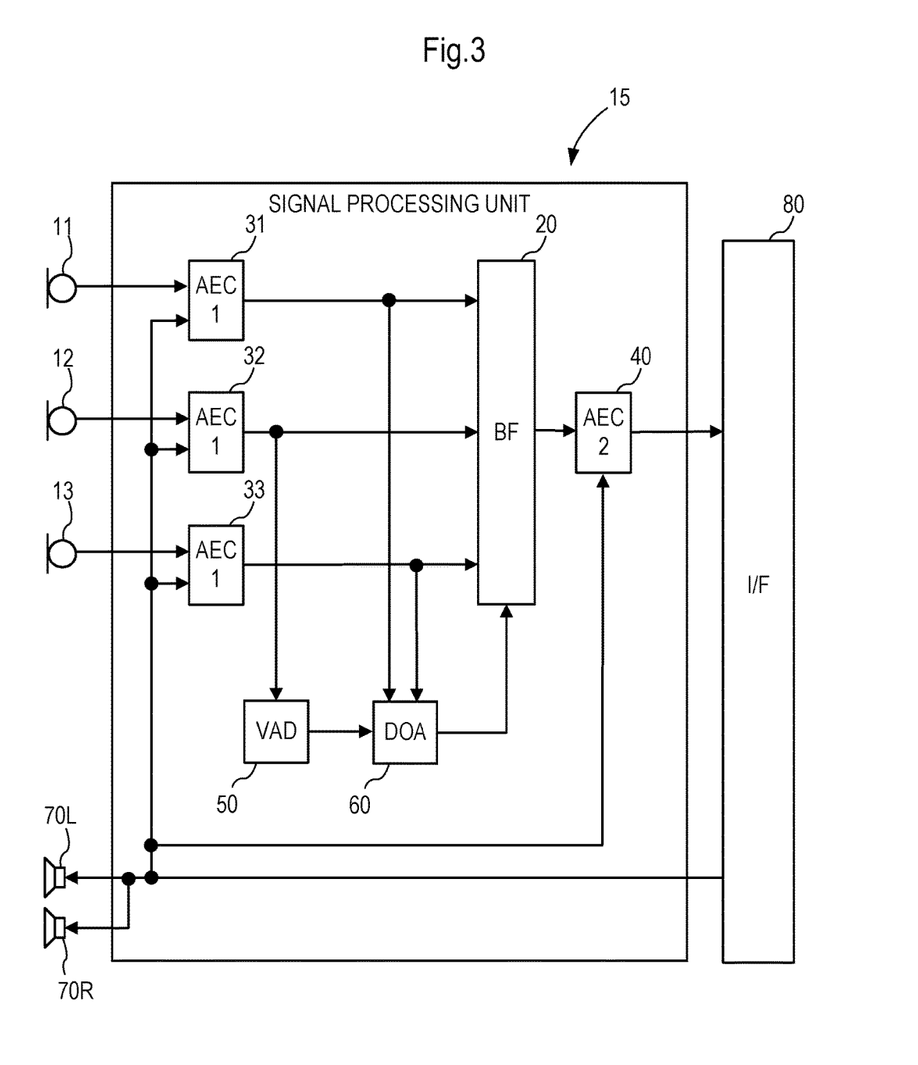
FIG. 3 is a functional block diagram illustrating a configuration of a signal processing unit 15.

FIG. 3 is a functional block diagram of the signal processing unit 15. As illustrated in FIG. 3, the sound emitting/collecting device 10 is provided with the microphone 11, the microphone 12, the microphone 13, the speaker 70L, the speaker 70R, the signal processing unit 15, and the interface (I/F) 19. The signal processing unit 15 is provided with a first echo canceller 31, a first echo canceller 32, s first echo canceller 33, a beam forming unit (BF) 20, a second echo canceller 40, a voice activity detection unit (VAD) 50, and a direction of arrival unit (DOA) 60.

The first echo canceller 31 is installed on the back of the microphone 11, the first echo canceller 32 is installed on the back of the microphone 12, and the first echo canceller 33 is installed on the back of the microphone 13. The first echo canceller 31, the first echo canceller 32, and the first echo canceller 33 carry out echo canceling on the collected sound signals of each microphone in front. By this, the first echo canceller 31, the first echo canceller 32, and the first echo canceller 33 remove echoes caused by the speaker 70L and the speaker 70R to each microphone.

The echo canceling carried out by the first echo canceller 31, the first echo canceller 32, and the first echo canceller 33 are made up of an FIR filter process and a subtraction process. The echo canceling inputs a signal emitted from the speaker 70L and the speaker 70R (emitted sound signal) that has been input to the signal processing unit 15 from the interface (I/F) 19, estimates the echo component using the FIR filter, and subtracts each estimated echo component from the collected sound signal input to the first echo canceller 31, the first echo canceller 32, and the first echo canceller 33.

The voice activity detection unit (VAD) 50 is installed on the back of the first echo canceller 32. In other words, the voice activity detection unit (VAD) 50 determines whether the collected sound signal collected in the microphone 12 positioned in the center is a voice. When it is determined in the voice activity detection unit (VAD) 50 that the sound is a human voice, a voice flag is input to the direction of arrival unit (DOA) 60. The voice activity detection unit (VAD) 50 will be described in detail below. Note that the voice activity detection unit (VAD) 50 is not limited to being installed on the back of the first echo canceller 32, and it may be installed on the back of the first echo canceller 32 or the first echo canceller 33.

The direction of arrival unit (DOA) 60 is installed on the back of the first echo canceller 31 and the first echo canceller 33. The direction of arrival unit (DOA) 60 detects the direction of arrival of a voice. The direction of arrival unit (DOA) 60 detects the direction of arrival ($\theta$) of the collected sound signal collected in the microphone 11 and the microphone 13 after the voice flag is input. The direction of arrival ($\theta$) will be described below in detail. To carry out detection only when the voice flag has been input in the direction of arrival unit (DOA) 60, the value of the direction of arrival ($\theta$) does not change even if noise other than that of a human voice occurs. The direction of arrival ($\theta$) detected in the direction of arrival unit (DOA) 60 is input to the beam forming unit (BF) 20. The direction of arrival unit (DOA) 60 will be described in detail below.

The beam forming unit (BF) 20 carries out a beam forming process based on the input direction of arrival ($\theta$). This beam forming process allows sound in the direction of arrival ($\theta$) to be focused on. Therefore, because noise arriving from directions other than the direction of arrival ($\theta$) can be minimized, it is possible to selectively collect a voice in the direction of arrival ($\theta$). The beam forming unit (BF) 20 will be described in detail below.

The second echo canceller 40 carries out a frequency spectrum amplitude multiplication process on a signal that has undergone the beam forming process by the beam forming unit (BF) 20. Therefore, the second echo canceller 40 can remove the remaining echo component that could not be removed by the subtraction process alone. The frequency spectrum amplitude multiplication process may be any kind of process, but uses, for example, at least one, or all of a spectral gain, a spectral subtraction, and an echo suppressor in a frequency domain. Because the remaining echo component is background noise in, for example, a room, it is an error component caused by an estimation error of the echo component occurring in the first echo canceller, oscillation noise of the housing occurring when the sound emitting level of the speaker 70 reaches a certain level, or the like. The second echo canceller 40 estimates the spectrum of the remaining echo component based on the spectrum of the echo component estimated in the subtraction process in the first echo canceller and the spectrum of the input signal, and removes the estimated spectrum of the remaining echo component from the input signal.

In this manner, the signal processing unit 15 of the present embodiment also removes an echo component that could not be removed by the subtraction process. However, even if the frequency spectrum amplitude multiplication process is carried out on the front, the information of the collected sound signal level is lost, therefore making a beam forming process difficult by the BF20. Furthermore, even if the frequency spectrum amplitude multiplication process is carried out on the front, the information of the harmonic power spectrum, power spectrum change rate, power spectrum flatness, formant intensity, harmonic intensity, power, first-order difference of power, second-order difference of power, cepstrum coefficient, first-order difference of cepstrum coefficient, and second-order difference of cepstrum coefficient described below are lost, calculating a cross-correlation function or the like in the voice activity detection unit (VAD) 50 becomes difficult. Then, the signal processing unit 15 of the present embodiment first removes the echo component using the subtraction process, carries out the beam forming process by the BF20, the voice determination by the voice activity detection unit (VAD) 50, and the detection process of the direction of arrival in the direction of arrival unit (DOA) 60, and carries out the frequency spectrum amplitude multiplication process on the signal that has undergone beam forming.

Figure 4:
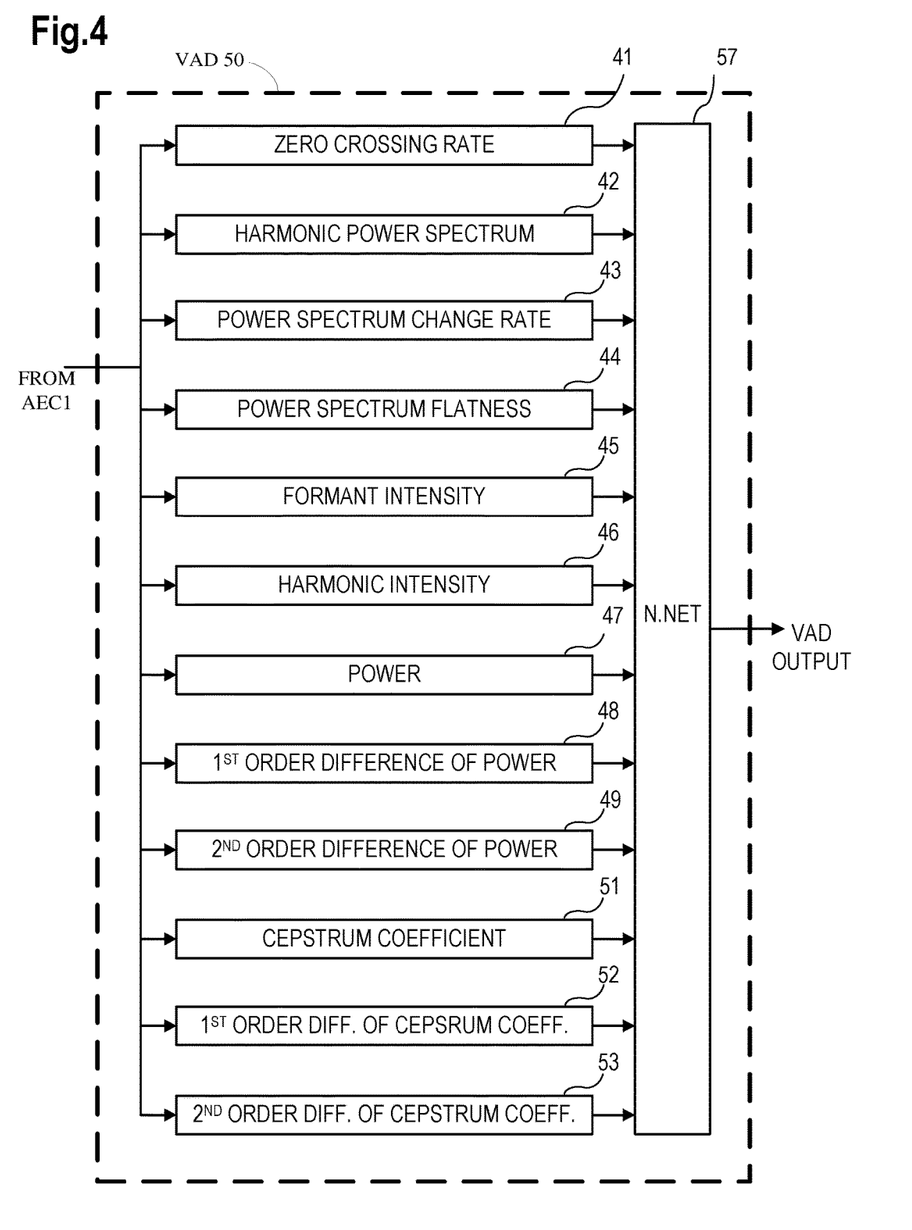
FIG. 4 is a functional block diagram illustrating a configuration of a voice activity detection unit (VAD) 50.

Next, the functions of the voice activity detection unit (VAD) 50 will be described in detail using FIG. 4. The voice activity detection unit (VAD) 50 carries out an analysis of various voice features in the voice signal using a neural network 57. The voice activity detection unit (VAD) 50 outputs a voice flag when it is determined that a collected sound signal is a human voice as a result of analysis.

The following are given as examples of various voice features: zero-crossing rate 41, harmonic power spectrum 42, power spectrum change rate 43, power spectrum flatness 44, formant intensity 45, harmonic intensity 46, power 47, first-order difference of power 48, second-order difference of power 49, cepstrum coefficient 51, first-order difference of cepstrom coefficient 52, and second-order difference of cepstrom coefficient 53.

The zero-crossing rate 41 calculates the frequency of appearance of a point that crosses zero for a voice signal in the time domain. Zero cross corresponds to the pitch which is the fundamental frequency of the voice. The harmonic power spectrum 42 indicates what degree of power the frequency component of each harmonic included in the voice signal has. The power spectrum change rate 43 indicates the rate of change of power to the frequency component of the voice signal. The power spectrum flatness 44 indicates the degree of the swell of the frequency component of the voice signal. The formant intensity 45 indicates the intensity of the formant component included in the voice signal. The harmonic intensity 46 indicates the intensity of the frequency component of each harmonic included in the voice signal. The power 47 is the power of the voice signal. The first-order difference of power 48, is the difference from the previous power 47. The second-order difference of power 49, is the difference from the previous first-order difference of power 48. The cepstrum coefficient 51 is the logarithm of the discrete cosine transformed amplitude of the voice signal. A first-order difference 52 of the cepstrum coefficient is the difference from the previous cepstrum coefficient 51. A second-order difference 53 of the cepstrum coefficient is the difference from the previous first-order difference 52 of the cepstrum coefficient.

Note that a voice signal emphasizing a high frequency may be used when finding the cepstrum coefficient 51 by using a pre-emphasis filter, and a discrete cosine transformed amplitude of the voice signal compressed by a mel filter bank may be used.

Note that the voice features are not limited to the parameters described above, and any parameter that can discriminate a human voice from other sounds may be used.

The neural network 57 is a method for deriving results from a judgment example of a person, and each neuron coefficient is set to an input value so as to approach the judgment result derived by a person.

The neural network 57 outputs a predetermined value based on an input value by inputting the value of various voice features (zero-crossing rate 41, harmonic power spectrum 42, power spectrum change rate 43, power spectrum flatness 44, formant intensity 45, harmonic intensity 46, power 47, first-order difference of power 48, second-order difference of power 49, cepstrum coefficient 51, first-order difference of cepstrum coefficient 52, or second-order difference of cepstrum coefficient 53) in each neuron. The neural network 57 outputs each of a first parameter value, which is a human voice, and a second parameter value, which is not a human voice in the final two neurons. Finally, the neural network 57 determines that it is a human voice when the difference between the first parameter value and the second parameter value exceeds a predetermined threshold value. By this, the neural network 57 can determine whether the voice is a human voice based on the judgment example of a person.

Figure 5:
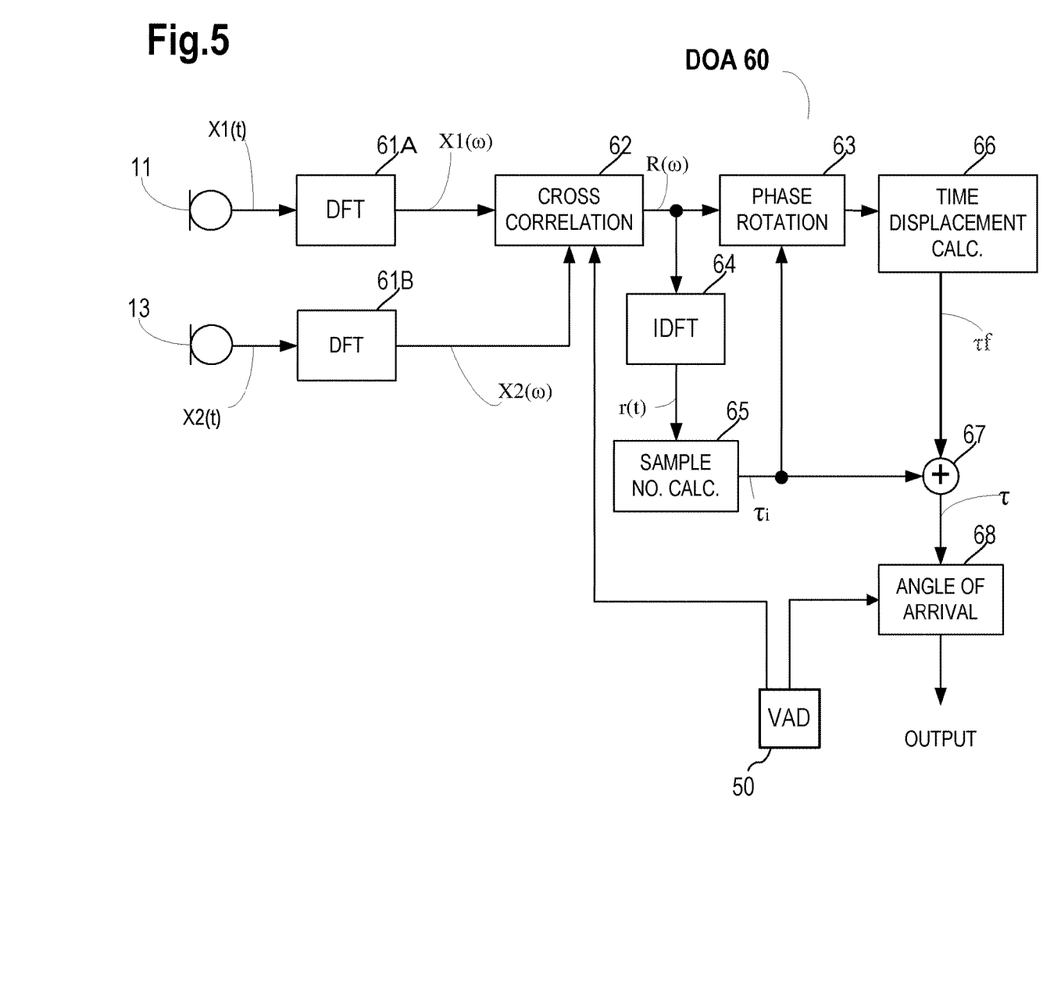
FIG. 5 is a functional block diagram illustrating the configuration of a direction of arrival unit (DOA) 60.
Figure 6:
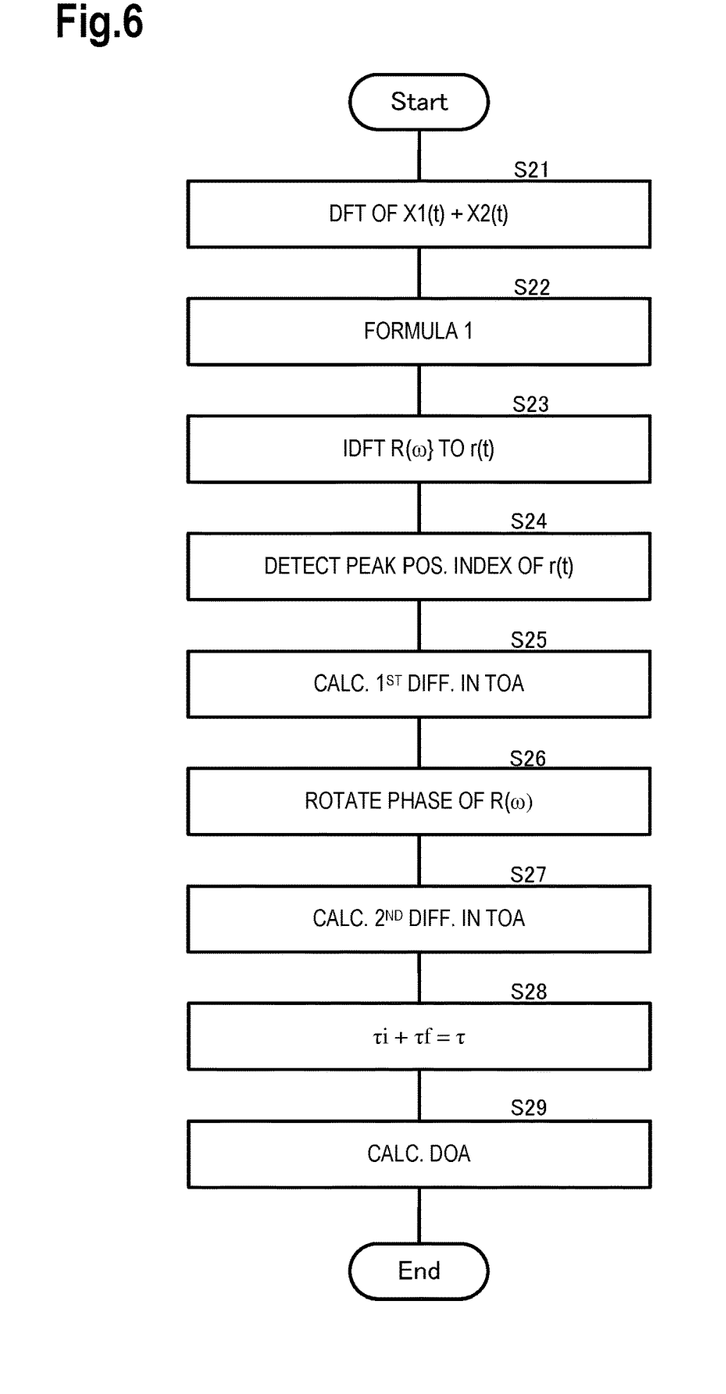
FIG. 6 is a flowchart illustrating the operation of the direction of arrival unit (DOA) 60.

Next, FIG. 5 is a functional block diagram illustrating the configuration of the direction of arrival (DOA) unit 60, and FIG. 6 is a flowchart illustrating the operation of the direction of arrival (DOA) detection unit 60. Turning first to the DOA unit 60 in FIG. 5, this unit is provided with discrete Fourier transforms DFT 61A and DFT 61B, a cross-correlation function calculation unit 62, a phase rotation unit 63, an inverse discrete Fourier transform (IDFT) 64, sample number calculation unit 65, time displacement calculation unit 66, an adder 67, and an angle of arrival calculation unit 68.

The DFT 61A and DFT 61B respectively receive the collected sound signal of the microphone 11 X1($t$) and the collected sound signal of the microphone 13 X2($t$). Note that in the AEC31 and AEC33 are omitted in FIG. 4, but the collected sound signal of the microphone 11 X1($t$) and the collected sound signal of the microphone 13 X2($t$) are collected sound signals after echo canceling has been carried out. Note that in this example, the DOA 60 uses the collected sound signals of the microphone 11 and the microphone 13, but the collected sound signals of other microphones may also be used. However, because the direction of arrival of the sound source is estimated using the distance between microphones, the accuracy is higher the larger the distance between microphones is. Because of this, it is desirable for the collected sound signals of the microphone 11 and the microphone 13 to be used, as they are the furthest apart. The DFT61A and the DFT61B carry out the Fourier transformation on the collected sound signal X1($t$) and the collected sound signal X2($t$), and transform them into signal X1($\omega$) and X2($\omega$) of the frequency domain as shown in FIG. 5 and at S21 in FIG. 6.

The cross-correlation function calculation unit 62, in FIG. 5, calculates the whitening cross spectrum R ($\omega$) of the collected and transformed sound signals X1($t$) and X2($t$) following formula 1 below (S22). A predetermined time constant is applied to the whitening cross spectrum R ($\omega$).

$$R(\omega) = a \cdot R(\omega) + (1-a) \cdot \frac{conj(X1(\omega)) \cdot X2(\omega)}{|conj(X1(\omega)) \cdot X2(\omega)|} \quad \text{Formula 1}$$

The calculated whitening cross spectrum R($\omega$) is input to the phase rotation unit 63 and the IDFT 64. The IDFT 64 carries out inverse transformation on the whitening cross spectrum R($\omega$) which results in a whitening cross-correlation function r(t) (FIG. 6, S23).

The sample number calculation unit 65 finds the peak position index of the whitening cross-correlation function r(t) (FIG. 6, S24). The sample number corresponding to the position of the peak represents the difference in time of arrival between microphone 11 and microphone 13. The sample number calculation unit 65 finds the difference in time of arrival (first difference in time of arrival, $\tau i$) of sound from the sound source to the microphone 11 and to the microphone 13 by dividing the peak position index by the sampling frequency as shown in formula 2 below (FIG. 6, S25). This first difference in time of arrival is expressed as an integer value of one or more sample times. For example, if a sample rate is 48 KHz, then the time from one sample to the next (inter-sample time) is approximately 20.8 microseconds, and if the sample number calculation unit determines that the sound arrives at a second microphone one sample time after it arrives at a first microphone, then this delay is equal to at least 20.8 microseconds.

$$\tau_i = \frac{\text{PEAK\_INDEX}(r(t))}{fs} \quad \text{Formula 2}$$

Note that the sample number calculation unit 65 may find the cross-correlation function of the collected sound signal of the microphone 11 $X1(t)$ and the collected sound signal of the microphone 13 $X2(t)$ in the time domain, or the whitening cross-correlation function, and calculate the first difference in time of arrival. Furthermore, the sample number calculation unit 65 may find the time when each of the collected sound signal $X1(t)$ and the collected sound signal $X2(t)$ are at their peak level (time when the largest value of amplitude is given), and calculate the first difference in time of arrival from the difference in this peak level time, but this time is not more accurate than one sample time.

Because this first difference in time of arrival, τi, of a sample is a time difference corresponding to when the cross-correlation function or whitening cross-correlation function shows a peak, it cannot obtain accuracy equal to or greater than the sampling frequency (i.e., 20.8 microseconds). Therefore, the DOA 60 of the present embodiment calculates a second, fractional difference in time of arrival value, which is a difference in time of arrival of one sample by correcting the whitening cross spectrum R (ω) based on the first difference in time of arrival, and analyzing the corrected whitening cross spectrum R' (ω). This second difference in time of arrival is a fractional value that is less than one sample time.

In other words, the phase rotation unit 63 first rotates the phase of the whitening cross spectrum R (ω) using the first difference in time of arrival $\tau_1$ as illustrated in formula 3 below (S26).

$$R'(\omega)=e^{-i\omega(-\tau i)} \cdot R(\omega) \quad \text{Formula 3}$$

Figure 7:
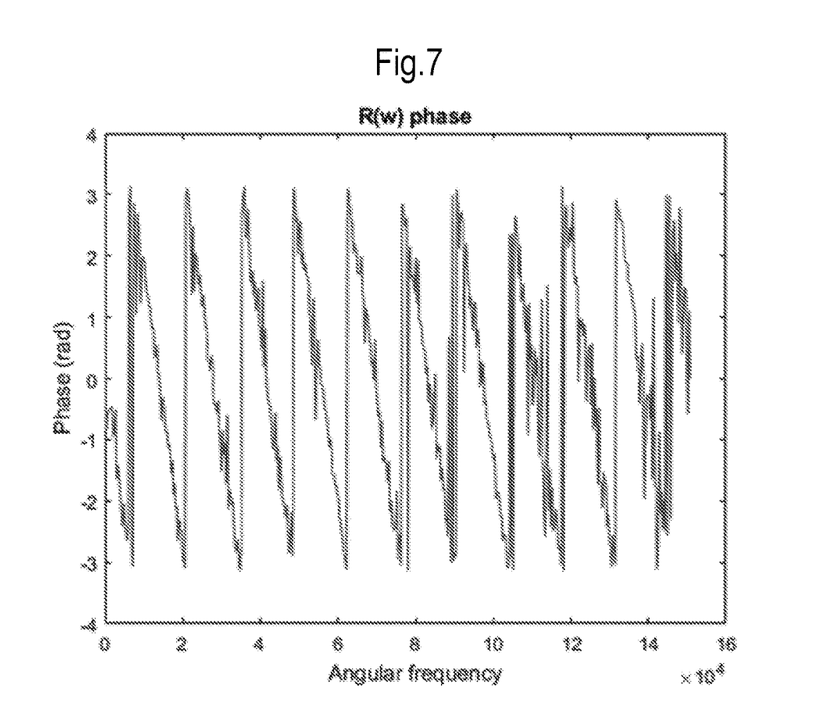
FIG. 7 is a diagram illustrating the phase of a whitening cross spectrum $R(\omega)$.
Figure 8:
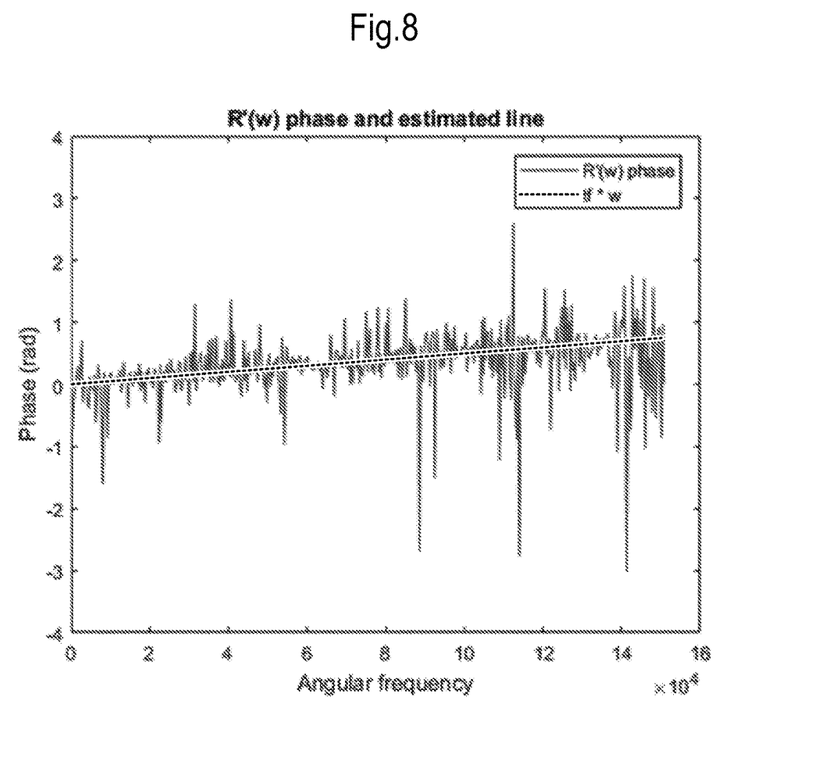
FIG. 8 is a diagram illustrating the phase of a whitening cross spectrum $R'(\omega)$.

The whitening cross spectrum R(ω) is an angular frequency function, and FIG. 7 shows the plot of R(ω) versus angular frequency for an audio signal sample. The DOA 118 computes the slope of these phase values which corresponds to the difference in time of arrival of the audio signal. This time difference is expressed as an integer number of audio samples. However, because the phase values are not smooth in the angular frequency domain (as illustrated in FIG. 7), calculating the slope accurately from it is a challenge. To resolve this, the whitening cross spectrum R(ω) is transformed to the time domain. By calculating the sample number corresponding to the peak of the transformed whitening cross spectrum, the first difference in time of arrival τi (offset) is obtained. The phase rotation unit 463 rotates the phase of the original whitening cross spectrum R (ω) using this newly obtained time offset τi. Subsequently, the time displacement calculation unit 66 obtains a subsample delay τf from the slope of this rotated whitening cross spectrum R'(ω) using a least squares fit (as shown below in formulas 4 and 5), and this subsample delay τf is referred to herein as a second difference in time of arrival.

$$\alpha(\omega) = \tan^{-1}\frac{\text{img}(R'(\omega))}{\text{real}(R'(\omega))} \quad \text{Formula 4}$$

$$\tau_f = -\frac{\Sigma \alpha(\omega) \cdot \omega}{\Sigma \omega^2} \quad \text{Formula 5}$$

Further, because accuracy decreases in the high frequency domain when the sound source type is voice, it is desirable to remove at least a portion of the high frequency component from the sound signal sample (i.e., frequencies above 2 kHz can be removed).

Subsequent to calculating the first and second time difference of arrival times, the adder 67 calculates an actual or third difference in time of arrival τ (total time difference of arrival) by adding the first difference in time of arrival ti and the second difference in time of arrival τf as shown in (S28) of FIG. 6.

Finally, the angle of arrival calculation unit 68 finds the direction of arrival of the voice (θ) using the third difference in time of arrival τ (S29).

Figure 9:
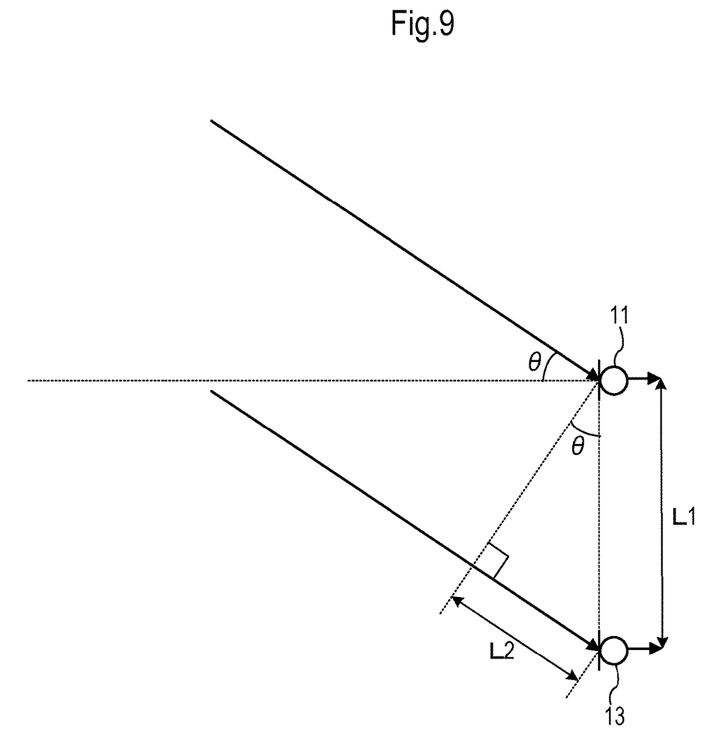
FIG. 9 is a diagram illustrating the relationship between the direction of arrival and the displacement of sound due to the microphone.

As illustrated in FIG. 9, the direction of arrival of the voice θ is shown as an angle displacement with respect to the front direction of the housing (direction perpendicular to the surface on which the microphone 11 and the microphone 13 are aligned). If the distance between the microphone 11 and the microphone 13 is L1, and the speed of sound is C, the direction of arrival of the voice θ is expressed in formula 6 below by: distance L2 corresponding to the third difference in time of arrival τ between microphones=C·τ.

$$\theta = \sin^{-1}\frac{C \cdot \tau}{L1} \quad \text{Formula 6}$$

Note that the angle of arrival calculation unit 68 and the cross-correlation function calculation unit 62 renews each of the direction of arrival of the voice θ and the whitening cross spectrum R(ω) when the voice flag is input from the voice activity detection unit (VAD) 50. The angle of arrival calculation unit 68 and the cross-correlation function calculation unit 62 maintain the preceding direction of arrival (θ) and the whitening cross spectrum R(ω) without renewing the direction of arrival of the voice θ and the whitening cross spectrum R(ω) when the voice flag is not input from the voice activity detection unit (VAD) 50. Additionally, the processes of the cross-correlation function calculation unit 62, the phase rotation unit 63, the IDFT 64, the sample number calculation unit 65, the time displacement calculation unit 66, the adder 67, and the angle of arrival calculation unit 68 are omitted when the voice flag is not input. By this, unnecessary processes can be omitted, and sensitivity is not given to sound sources other than a human voice.

The angle of arrival calculation unit 68 outputs the calculated direction of arrival θ to the beam forming unit (BF) 20.

Figure 10:
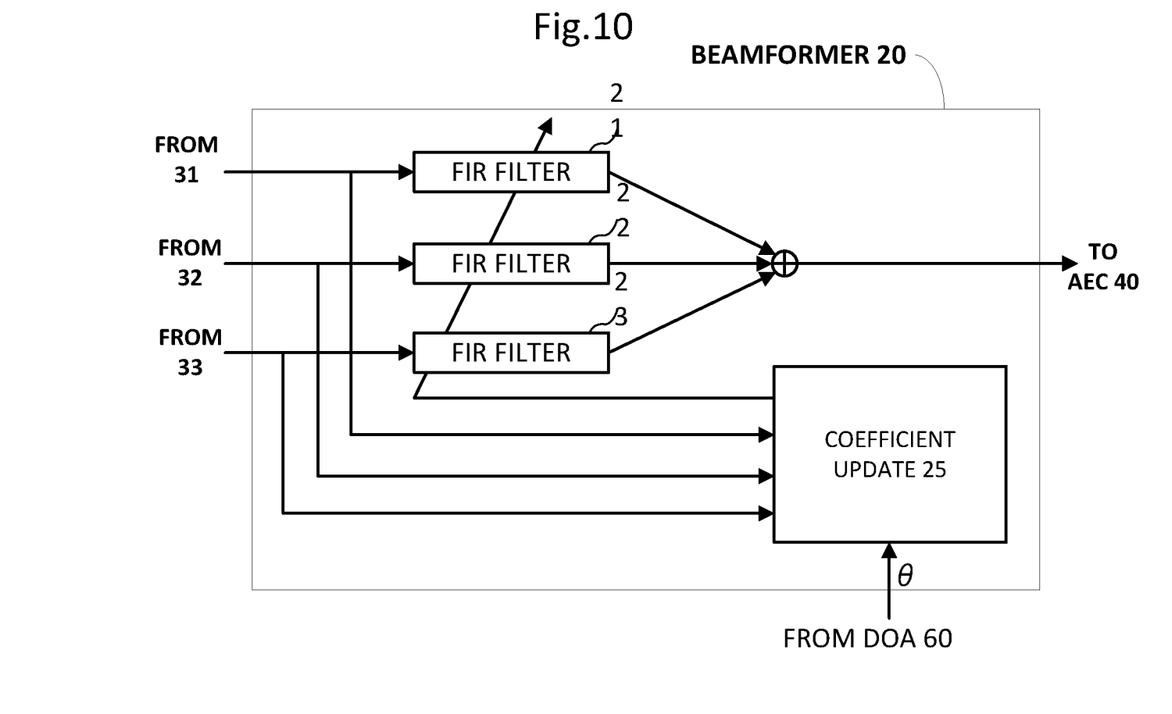
FIG. 10 is a block diagram illustrating the configuration of a beam forming unit (BF) 20.

FIG. 10 is a block diagram illustrating the configuration of the beam forming unit (BF) 20. The beam forming unit (BF) 20 has a plurality of adaptive filters installed therein, and carries out a beam forming process by filtering input voice signals. For example, the adaptive filters are configured by a FIR filter. Three FIR filters, namely a FIR filter 21, a FIR filter 22, and a FIR filter 23 are illustrated for each microphone in FIG. 10, but more FIR filters may be provided.

When the direction of arrival of the voice (θ) is input from the angle of arrival calculation unit 68, a beam coefficient renewing unit 25 renews the coefficient of the FIR filters. For example, the beam coefficient renewing unit 25 renews the coefficient of the FIR filters using an appropriate algorithm based on the input voice signal so that an output signal is at its minimum, under constraining conditions that the gain at the focus angle based on the renewed direction of arrival (θ) is 1.0. Therefore, because noise arriving from directions other than the direction of arrival (θ) can be minimized, it is possible to selectively collect voice in the direction of arrival (θ).

The beam forming unit (BF) 20 repeats processes such as those described above, and outputs a voice signal corresponding to the direction of arrival (θ). By this, the signal processing unit 15 can always collect sound with the direction having a human voice as the direction of arrival (θ) at high sensitivity. In this manner, because a human voice can be tracked, the signal processing unit 15 can suppress sound quality of a human voice from deteriorating due to noise.

Figure 11:
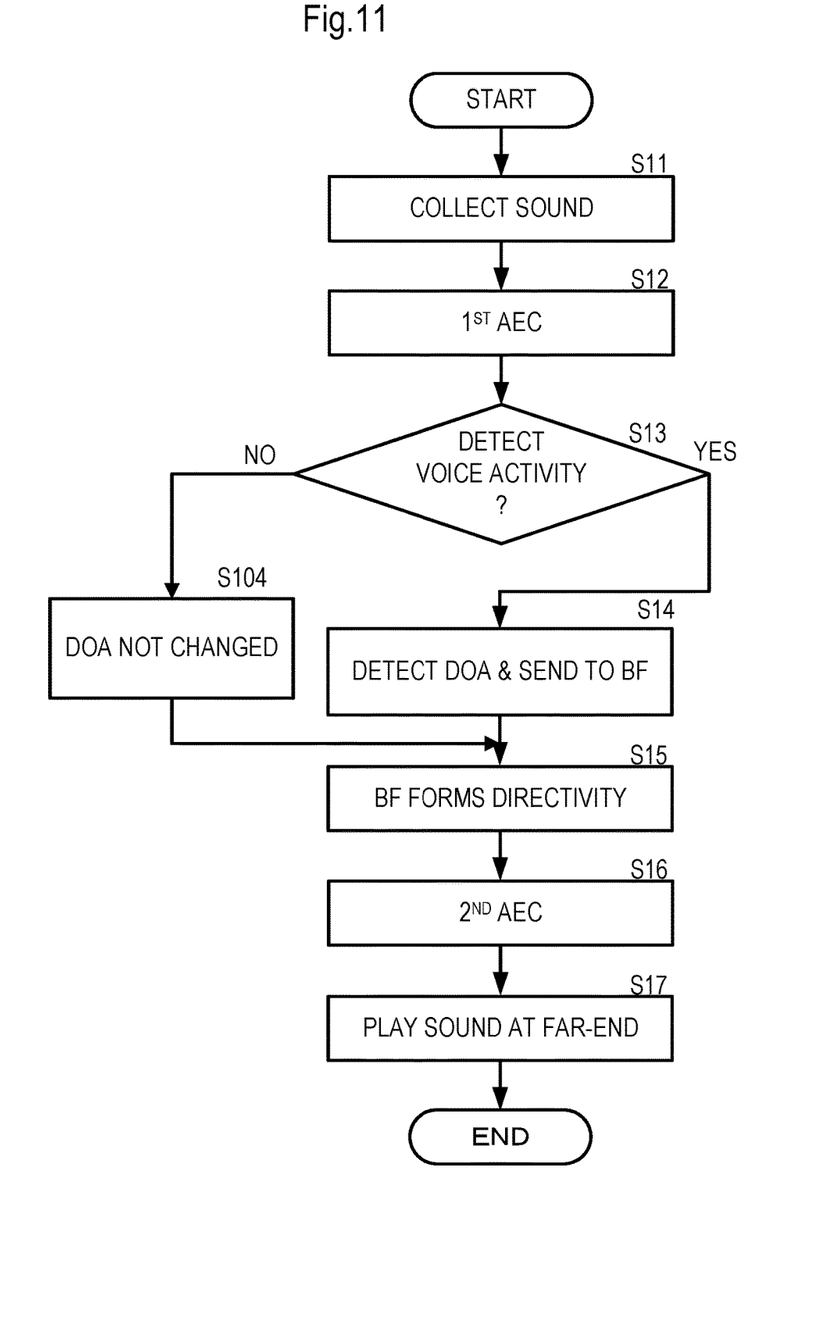
FIG. 11 is a flowchart illustrating the operation of the sound emitting/collecting device 10.

Next, FIG. 11 is a flowchart illustrating the operation of the sound emitting/collecting device 10. First, the sound emitting/collecting device 10 collects sound in the microphone 11, the microphone 12, and the microphone 13 (s11). The voice collected in the microphone 11, the microphone 12, and the microphone 13 is sent to the signal processing unit 15 as a voice signal.

Next, the first echo canceller 31, the first echo canceller 32, and the first echo canceller 33 carry out a first echo canceling process (s12). The first echo cancel process is a subtraction process as described above, and is a process in which the echo component is removed from the collected sound signal input to the first echo canceller 31, the first echo canceller 32, and the first echo canceller 33.

After the first echo canceling process, the voice activity detection unit (VAD) 50 carries out an analysis of various voice features in the voice signal using a neural network 57 (s13). When the voice activity detection unit (VAD) 50 determines that the collected sound signal is a voice as a result of the analysis (s13: Yes), the voice activity detection unit (VAD) 50 outputs a voice flag to the direction of arrival unit (DOA) 60. When the voice activity detection unit (VAD) 50 determines that there is no human voice (s13: No), the voice activity detection unit (VAD) 50 does not output a voice flag to the direction of arrival unit (DOA) 60. Therefore, the direction of arrival (θ) is maintained at the preceding direction of arrival (θ) (S104). By this, because the detection of the direction of arrival (θ) in the direction of arrival unit (DOA) 60 is omitted when there is not voice flag input, it is possible to omit unnecessary processes, and sensitivity is not given to sound sources other than a human voice.

Next, when the voice flag is output to the direction of arrival unit (DOA) 60, the direction of arrival unit (DOA) 60 detects the direction of arrival (θ) (s14). The detected direction of arrival (θ) is input to the beam forming unit (BF) 20.

The beam forming unit (BF) 20 forms directivity (s15). The beam forming unit (BF) 20 adjusts the filter coefficient of the input voice signal based on the direction of arrival (θ). The BF 20 carries out a beam forming process using the adjusted filter. By this, the beam forming unit (BF) 20 can selectively collect voice in the direction of arrival (θ) by outputting a voice signal corresponding to the direction of arrival (θ).

Next, the second echo canceller 40 carries out a second echo canceling process (s16). The second echo canceller 40 carries out a frequency spectrum amplitude multiplication process on the signal that has undergone the beam forming process in the beam forming unit (BF) 20. Therefore, the second echo canceller 40 can remove a remaining echo component that could not be removed in the first echo canceling process. The voice signal with the echo component removed is output from the second echo canceller 40 to an external device via the interface (I/F) 19.

The speaker 70 emits sound based on the voice signal input from the external device via the interface (I/F) 19 and the signal processing unit 15 (s17).

Note that in the present embodiment, an example of the sound emitting/collecting device 10 was given as a sound emitting/collecting device 10 having the functions of both emitting sound and collecting sound, but the present invention is not limited to this example. For example, it may be a sound collecting device having the function of collecting sound.

An object of the present invention is to detect the direction from which a sound arrives with high accuracy using a plurality of microphones. The device of the present embodiment is not necessarily limited to an example used for a teleconference wherein voice is collected, and a signal of the collected voice is output to another device.

Finally, it should be considered that the description of the present embodiment is exemplary in all respects, and does not limit the present invention. The scope of the present invention is not shown by the embodiment described above but by the scope of the claims. Additionally, the scope of the present invention includes scopes equivalent to the scope of the claims.

I claim:

1. A method for calculating a direction of arrival of sound with respect to microphones in a microphone array, comprising:

calculating, by a signal processing unit, a first difference in time of arrival value of sound from a sound source to a first and to a second one of a plurality of microphones comprising the microphone array, the first difference in time of arrival being an integer multiple of one sound inter-sample time, and calculating, by the signal processing unit, a second difference in time of arrival value of the sound from the sound source to a first and to a second one of the plurality of the microphones, the second difference in time of arrival being a fractional value representing a difference between the first difference in time of arrival and an actual difference in time of arrival of the sound;

adding the first and the second differences in time of arrival to determine a value of the actual difference in time of arrival of the sound; and determining a direction of arrival of the sound with respect to the first and the second microphones in the microphone array based on the value of the actual difference in time of arrival of the sound between the first and the second ones of the plurality of microphones.

2. The method according to claim 1, wherein the first difference in time of arrival is calculated based on cross correlation of a collected sound signal of the plurality of microphones.

3. The method according to claim 1, wherein the signal processing unit finds a third difference in time of arrival based on the first difference in time of arrival and the second difference in time of arrival, and estimates a position of the sound source based on the third difference in time of arrival.

4. The method according to claim 1, wherein directivity is formed based on a position of the sound source.

5. A sound collecting method, comprising:

calculating, by a signal processing unit, a first difference in time of arrival based on an approximation of a difference in time of arrival of a sound from a sound source to a plurality of microphones;

calculating, by the signal processing unit, a second difference in time of arrival which is the difference between the first difference in time of arrival and the difference in time of arrival; and estimating a position of the sound source based on the first difference in time of arrival; and the second difference in time of arrival;

wherein the second difference in time of arrival is smaller than the first difference in time of arrival.

6. The sound collecting method of claim 5, wherein the first difference in time of arrival is calculated based on cross correlation of a sound signal collected by the plurality of microphones.

7. The sound collecting method of claim 5, further comprising a beam forming unit that forms directivity based on the position of the sound source.

* * * * *